(12) United States Patent
Lohrentz et al.

(10) Patent No.: US 10,231,379 B2
(45) Date of Patent: Mar. 19, 2019

(54) EASY MOUNT STALK STOMPER

(71) Applicant: AGCO Corporation, Duluth, GA (US)

(72) Inventors: Randall Lohrentz, Buhler, KS (US); Daniel Dreyer, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/536,070

(22) PCT Filed: Dec. 30, 2015

(86) PCT No.: PCT/US2015/068133
§ 371 (c)(1),
(2) Date: Jun. 14, 2017

(87) PCT Pub. No.: WO2016/109714
PCT Pub. Date: Jul. 7, 2016

(65) Prior Publication Data
US 2018/0325027 A1 Nov. 15, 2018

Related U.S. Application Data

(60) Provisional application No. 62/098,192, filed on Dec. 30, 2014.

(51) Int. Cl.
*A01D 34/835* (2006.01)
*A01D 41/02* (2006.01)
*A01D 45/02* (2006.01)

(52) U.S. Cl.
CPC ....... *A01D 34/8355* (2013.01); *A01D 45/021* (2013.01)

(58) Field of Classification Search
CPC .. A01D 34/8355; A01D 45/021; A01D 45/02; A01D 75/18; A01D 75/182; A01D 75/185
See application file for complete search history.

(56) References Cited

U.S. PATENT DOCUMENTS 3,520,121 A * 7/1970 Ashton ................ A01D 45/021
56/106
3,982,384 A * 9/1976 Rohweder ............ A01D 45/021
56/106

(Continued)

FOREIGN PATENT DOCUMENTS

| DE | 10 2013 004438 B3 | 3/2014 | |
| EP | 2915421 B1 * | 5/2017 | ......... A01D 34/8355 |
| FR | 2181182 A6 * | 11/1973 | ......... A01D 34/8355 |

OTHER PUBLICATIONS

UK Intellectual Property Office, International Search Report for related UK Application No. GB1500829.5, dated Jun. 22, 2015.

(Continued)

*Primary Examiner* — Thomas B Will
*Assistant Examiner* — Joan D Misa

(57) ABSTRACT

A row crop harvesting header (24) operable to be advanced along a forward travel direction to harvest a series of plants in a crop row. The row crop harvesting header broadly includes a row crop toolbar (48), a crop-gathering row unit assembly, and a plant stalk stomper (42). The row crop toolbar (48) extends laterally relative to the forward travel direction. The row unit assembly is supported by the toolbar (48) to define a forwardly extending row path, with the row unit assembly being operable to collect the crop row along the row path and sever crop stalks as the header (24) moves forwardly. The row unit housing (54) is attached to the row crop toolbar (48) with forward and aft fasteners (44). The plant stalk stomper (42) is attached to the toolbar (48) with at least one of the fasteners (44).

20 Claims, 9 Drawing Sheets

(56) References Cited

U.S. PATENT DOCUMENTS

| | | | |
|---|---|---|---|
| 4,029,155 A * | 6/1977 | Blair | A01B 23/043 |
| | | | 172/142 |
| 4,144,698 A * | 3/1979 | Shelton | A01D 65/08 |
| | | | 56/1 |
| 4,149,361 A | 4/1979 | Pauletti et al. | |
| 4,211,057 A * | 7/1980 | Dougherty | A01D 41/141 |
| | | | 56/10.2 E |
| 4,573,308 A * | 3/1986 | Ehrecke | A01D 41/14 |
| | | | 56/14.4 |
| 4,723,608 A | 2/1988 | Pearson et al. | |
| 6,289,659 B1 * | 9/2001 | Fox | A01D 46/08 |
| | | | 56/10.2 E |
| 6,516,595 B2 * | 2/2003 | Rhody | A01B 63/1145 |
| | | | 172/4 |
| D742,938 S * | 11/2015 | Benoit | D15/28 |
| 9,730,374 B2 * | 8/2017 | Wick | A01B 39/22 |
| 9,743,587 B2 * | 8/2017 | Lohrentz | A01D 45/021 |
| 2002/0112461 A1 * | 8/2002 | Burk | A01D 34/8355 |
| | | | 56/504 |
| 2011/0179758 A1 * | 7/2011 | Kitchel | A01D 34/8355 |
| | | | 56/52 |
| 2012/0159917 A1 * | 6/2012 | Lohrentz | A01D 45/021 |
| | | | 56/60 |
| 2013/0019581 A1 * | 1/2013 | Hyronimus | A01D 63/00 |
| | | | 56/314 |
| 2013/0020100 A1 | 1/2013 | Shoup | |
| 2013/0020101 A1 | 1/2013 | Shoup | |
| 2013/0061569 A1 | 3/2013 | McClenathen | |
| 2013/0174529 A1 * | 7/2013 | Hyronimus | A01D 75/00 |
| | | | 56/314 |
| 2013/0177348 A1 | 7/2013 | Hyronimus et al. | |
| 2013/0192857 A1 * | 8/2013 | Shoup | A01B 35/20 |
| | | | 172/833 |
| 2014/0131973 A1 | 5/2014 | Benoit et al. | |
| 2015/0096773 A1 * | 4/2015 | Miller | A01D 34/8355 |
| | | | 172/540 |
| 2016/0066504 A1 * | 3/2016 | Holman | A01D 34/8355 |
| | | | 56/504 |
| 2016/0183468 A1 * | 6/2016 | Lohrentz | A01D 45/021 |
| | | | 56/51 |
| 2017/0367262 A1 * | 12/2017 | Lohrentz | A01D 45/021 |

OTHER PUBLICATIONS

European Patent Office, International Search Report for parent International Application No. PCT/US2015/068133, dated Apr. 5, 2016.

* cited by examiner

EASY MOUNT STALK STOMPER

RELATED APPLICATION

Under provisions of 35 U.S.C. § 119(e), Applicant claims the benefit of U.S. Provisional Application No. 62/098,192, entitled EASY MOUNT STALK STOMPER and filed Dec. 30, 2014, which is incorporated herein by reference.

BACKGROUND

Field of Invention

The present invention relates generally to row crop harvesters. More specifically, embodiments of the present invention concern a row crop header that includes a stalk stomper.

Discussion of Prior Art

Conventional row crop harvesters include a row crop header with a plurality of discrete row units spaced laterally along the header length. The header is positioned so that each row unit is aligned with a row of plants to be harvested and is advanced along the rows to sever the plant stalks and receive an upper part of the plants.

However, conventional row crop headers have various deficiencies. For instance, prior art headers sever the plant stalks so that a lower part of the plant stalk remains standing. For plants with relative large-diameter stalks, such as corn, the remaining stalk can puncture or otherwise damage a tire of the harvester (or another vehicle traveling across the field).

It is also known in the art to attach a stomper mechanism to a row crop header so that the mechanism is positioned behind the header. However, conventional stomper mechanisms are bulky and are exposed relative to the header.

SUMMARY

The following brief summary is provided to indicate the nature of the subject matter disclosed herein. While certain aspects of the present invention are described below, the summary is not intended to limit the scope of the present invention.

Embodiments of the present invention provide a harvesting header that does not suffer from the problems and limitations of the prior art headers set forth above.

A first aspect of the present invention concerns a row crop harvesting header operable to be advanced along a forward travel direction to harvest a series of plants in a crop row. The row crop harvesting header broadly includes a row crop toolbar, a crop-gathering row unit assembly, and a plant stalk stomper. The row crop toolbar extends laterally relative to the forward travel direction. The crop-gathering row unit assembly is supported by the toolbar to define a fore-and-aft extending row path, with the row unit assembly being operable to collect the crop row along the row path and sever crop stalks as the header moves forwardly. The row unit assembly includes a row unit bracket supported by and located adjacent to the row crop toolbar along at least one side of the row path to support the row unit assembly. The row unit housing is attached to the row crop toolbar by a forward fastener and an aft fastener located, respectively, forward and aft of the toolbar. The plant stalk stomper is attached to the toolbar using at least one of the forward and aft fasteners. The plant stalk stomper is laterally aligned with the row path to engage and knock down the severed stalks of the crop row.

A second aspect of the present invention concerns a row crop harvesting header operable to be advanced along a forward travel direction to harvest a series of plants in a crop row. The row crop harvesting header broadly includes a row crop toolbar, a crop-gathering row unit assembly, and a plant stalk stomper. The row crop toolbar extends laterally relative to the forward travel direction. The crop-gathering row unit assembly is supported by the toolbar to define a fore-and-aft extending row path, with the row unit assembly being operable to collect the crop row along the row path and sever crop stalks as the header moves forwardly. The row unit assembly is attached to the row crop toolbar by a forward fastener and an aft fastener located, respectively, forward and aft of the toolbar. The plant stalk stomper is mounted to the toolbar using the fasteners and is laterally aligned with the row path to engage and knock down the severed stalks of the crop row. The plant stalk stomper includes a mounting base that presents opposite forward and aft mounting ends. One of the mounting ends of the mounting base is attached directly to a respective one of the forward and aft fasteners, with the mounting base presenting a cam surface along the other one of the mounting ends to engage at least one of the plant stalk stomper and the row unit assembly so that the mounting base is under tension between the forward and aft fasteners.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 5:
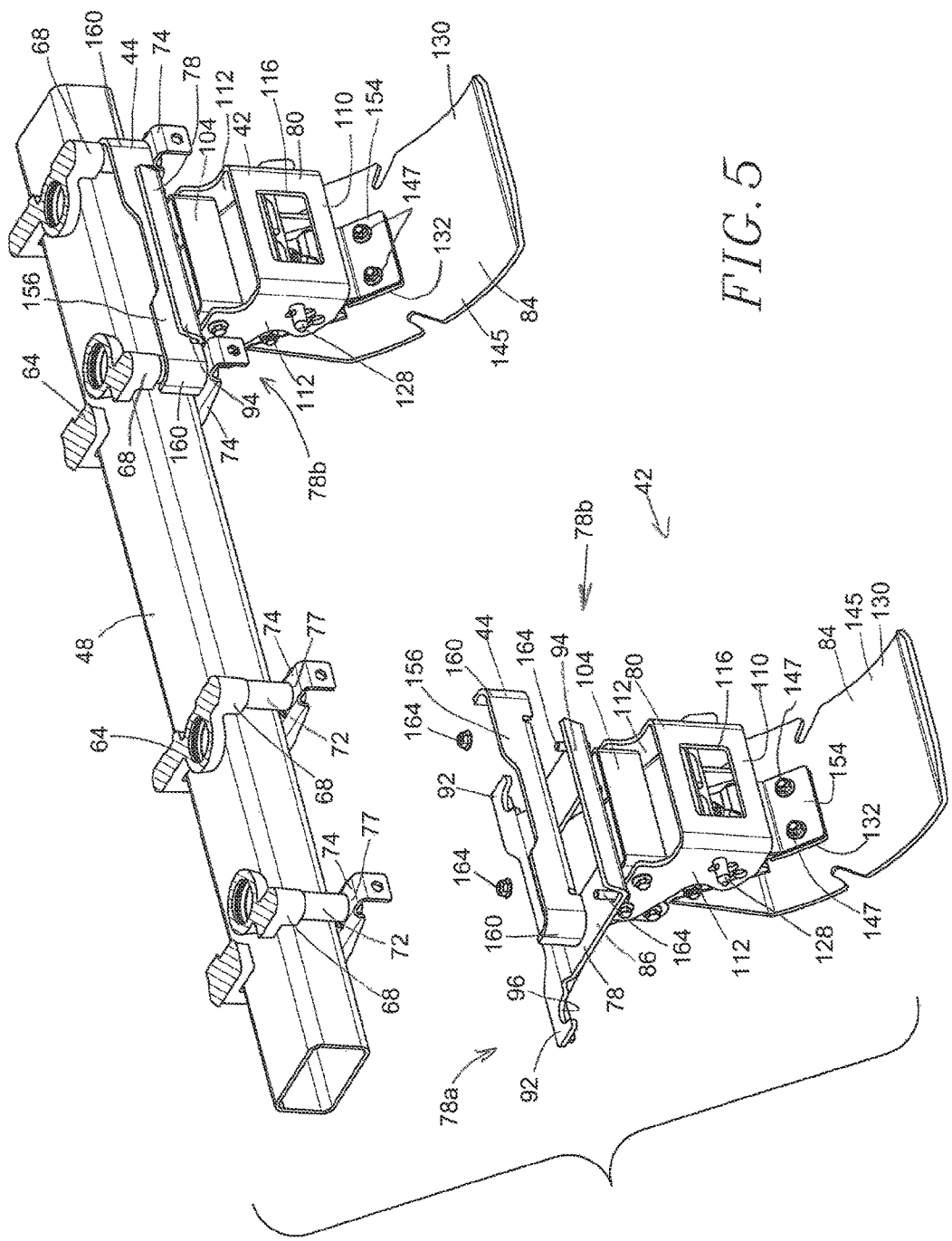
Figure 6:
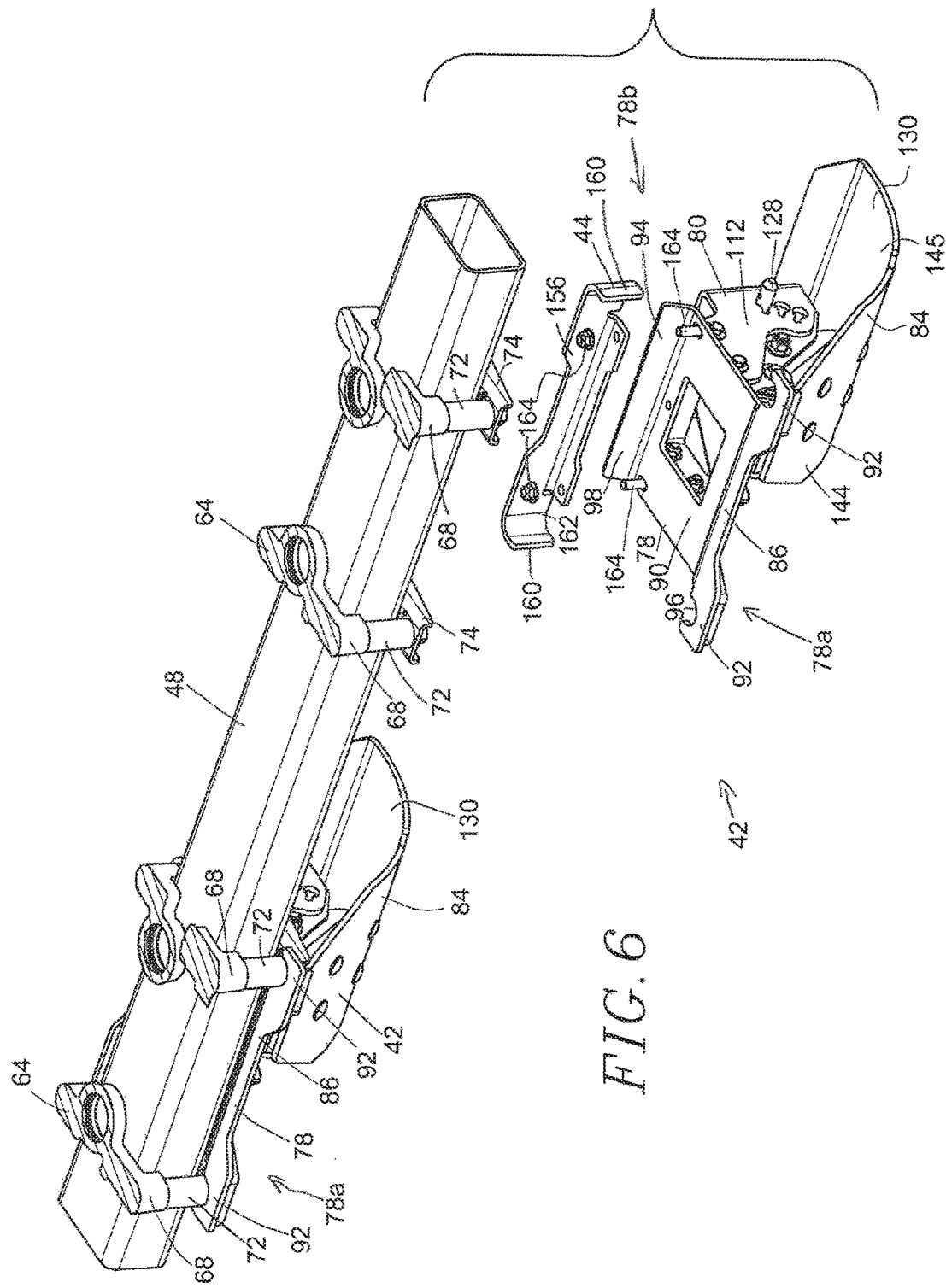
Figure 7:
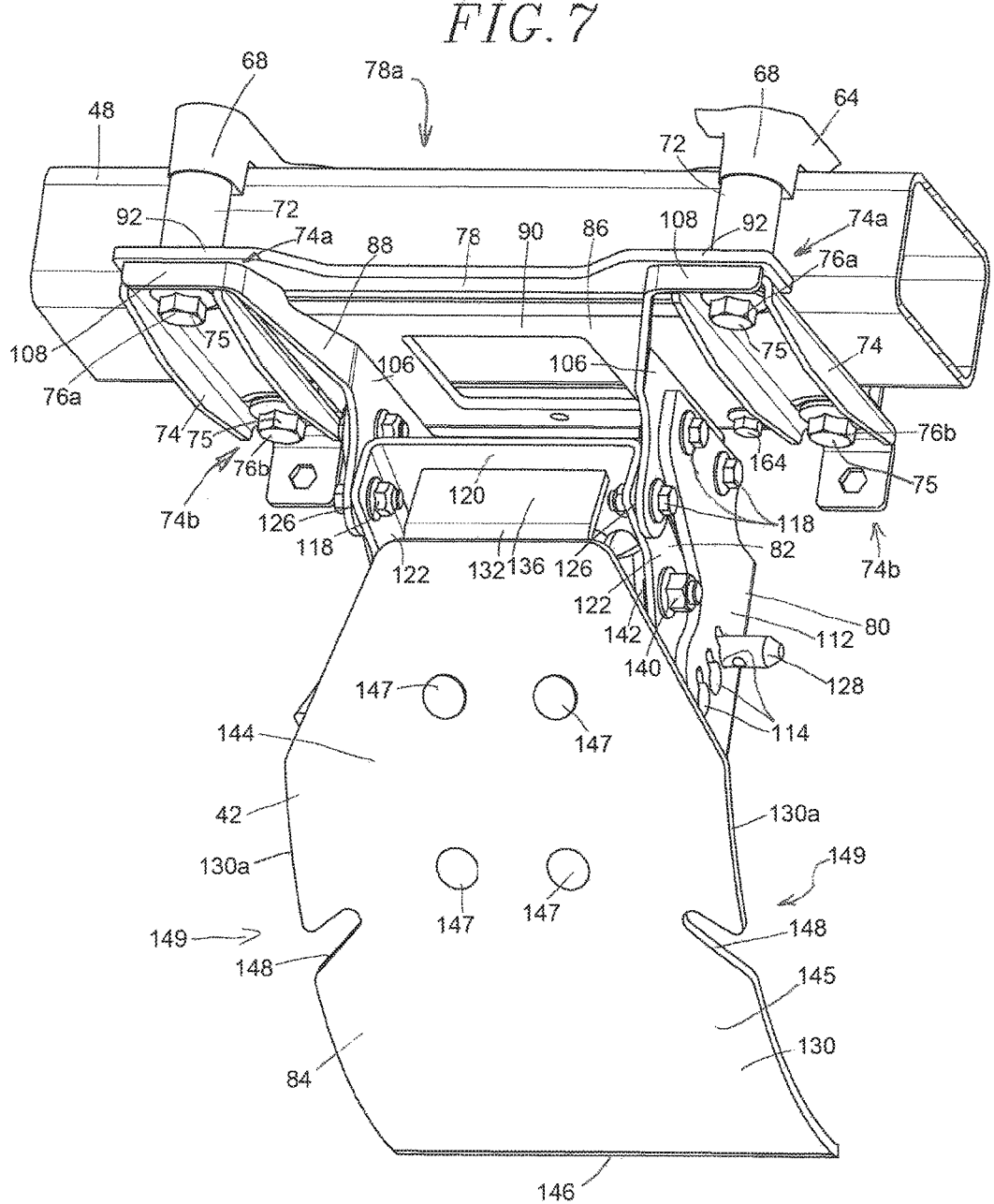
Figure 8:
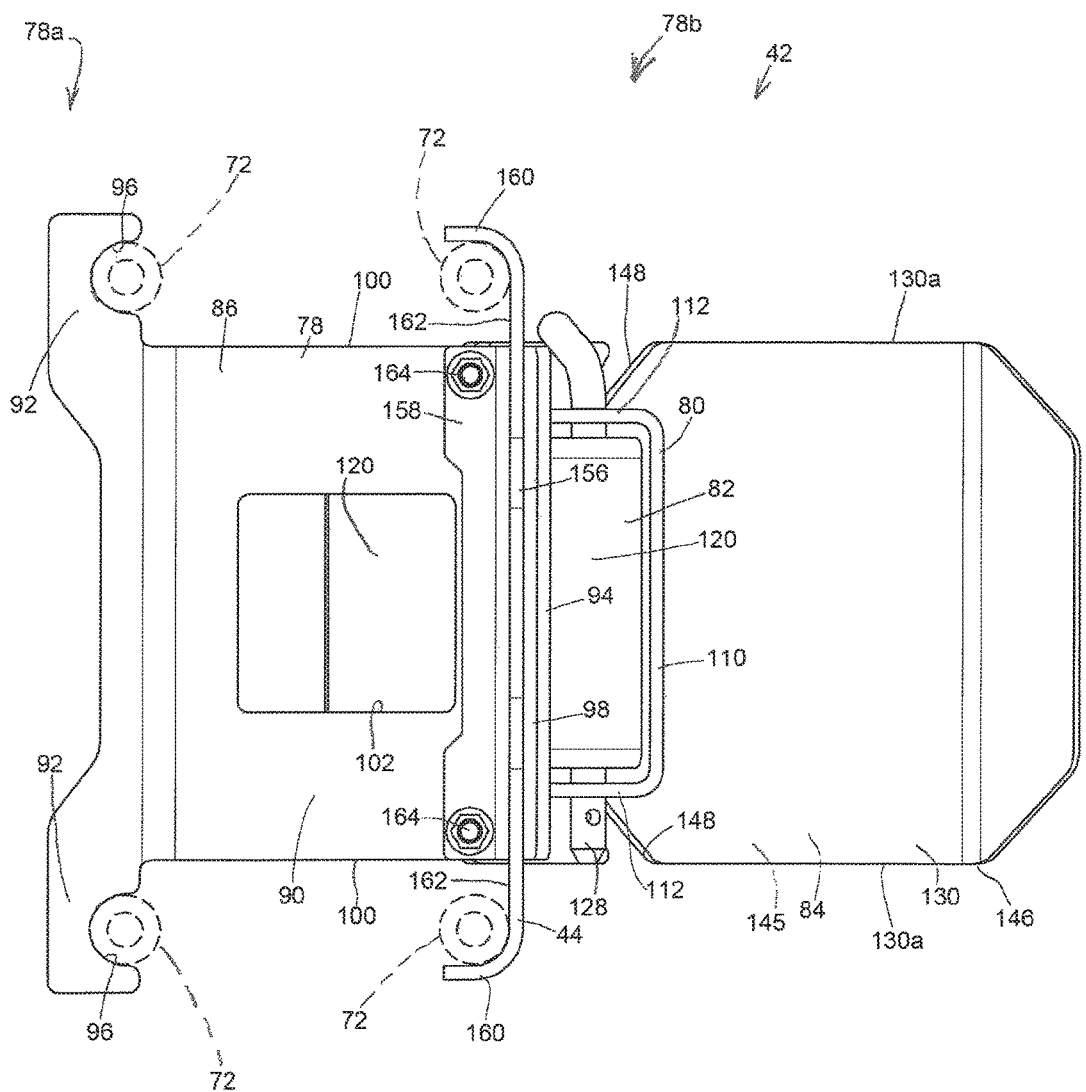
Figure 9:
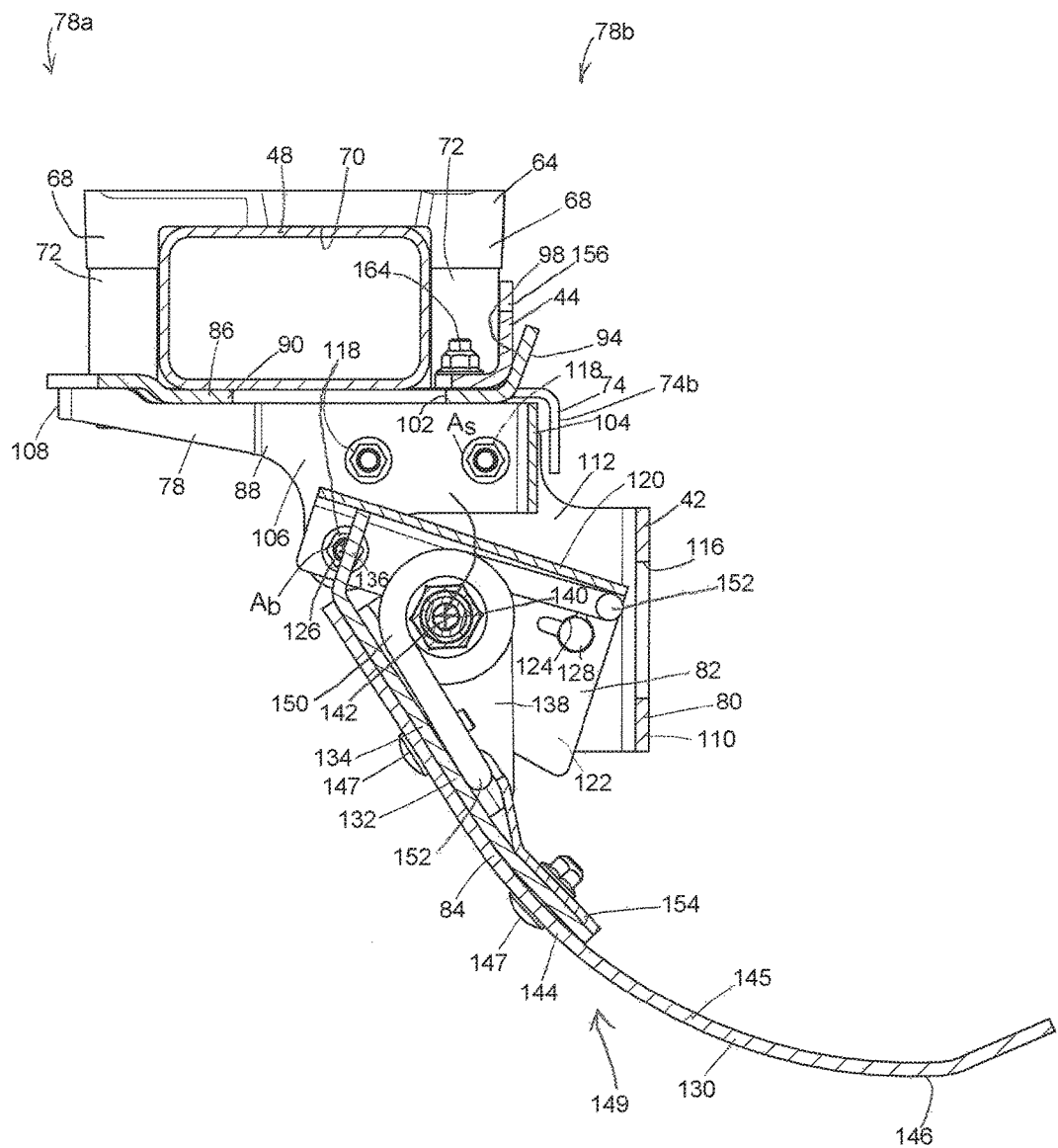

FIG. 5 is a fragmentary rear perspective of the row crop header shown in FIGS. 1-4, showing a toolbar of the header frame, lowermost portions of the row unit housing secured to the toolbar with brackets and tubular spacers, and a pair of stalk stompers mounted to the toolbar with braces, with one of the stalk stompers shown attached to the toolbar and the other stalk stomper exploded from the toolbar;

FIG. 6 is a fragmentary front perspective of the row crop header similar to FIG. 5, but viewed from the front of the header;

FIG. 7 is an enlarged fragmentary perspective of the row crop header shown in FIGS. 1-6, showing a mounting base, skid support bracket, skid adjustment bracket, and skid of one of the stalk stompers, with the mounting base being removably attached to the toolbar;

FIG. 8 is a fragmentary top view of the row crop header shown in FIGS. 1-7, showing the stalk stomper and brace mounted relative to the tubular spacers, with the brace engaging a rearward pair of the tubular spacers and the mounting base engaging a forward pair of the tubular spacers and the brace; and FIG. 9 is a fragmentary cross section of the row crop header shown in FIGS. 1-8, showing the stalk stomper and brace secured to the toolbar.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
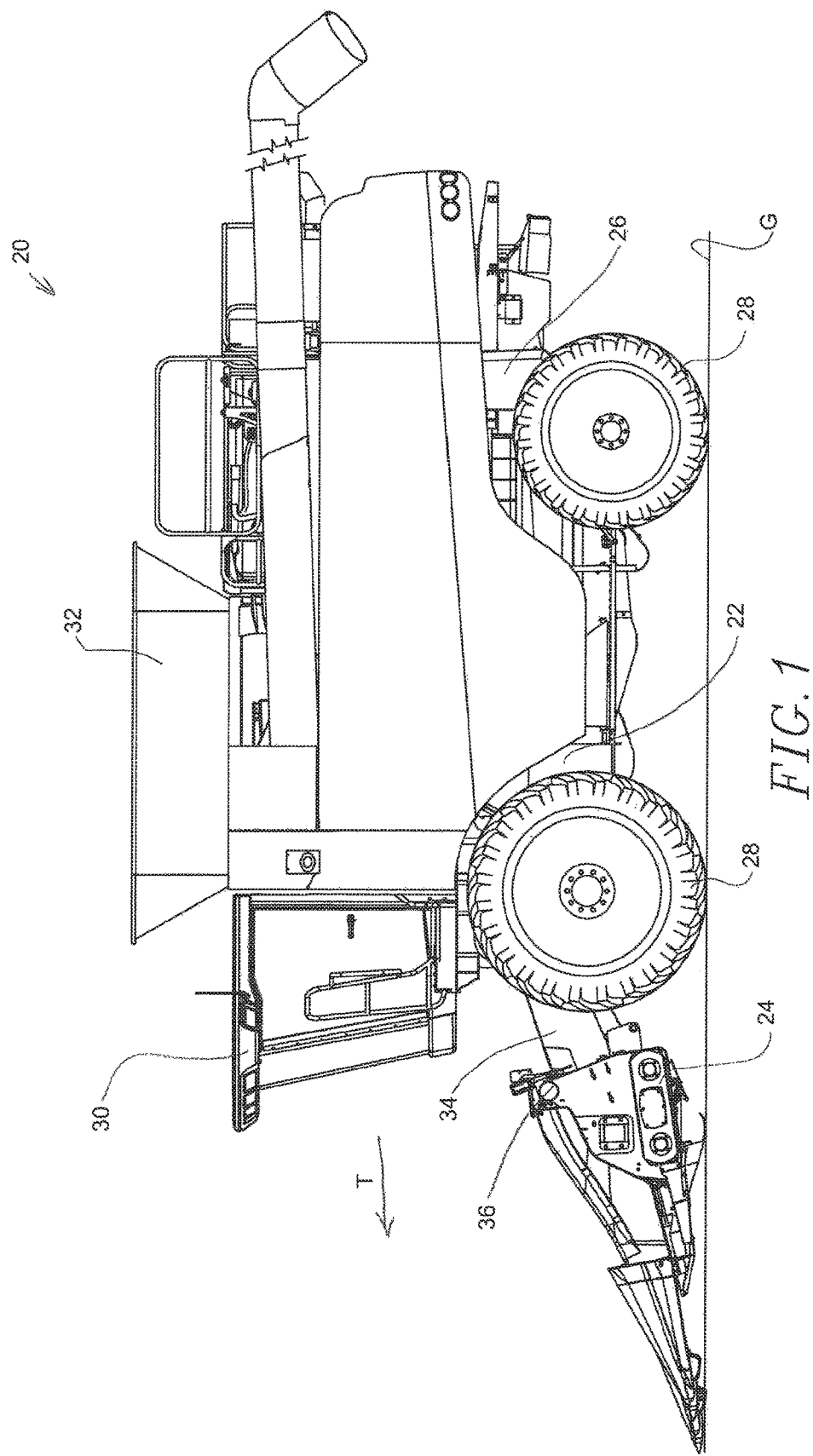
FIG. 1 is a side elevation of a row crop harvester constructed in accordance with a preferred embodiment of the present invention, with the harvester including a wheeled chassis, a feederhouse shiftably supported by the chassis, and a row crop header mounted on an end of the feederhouse.
Figure 2:
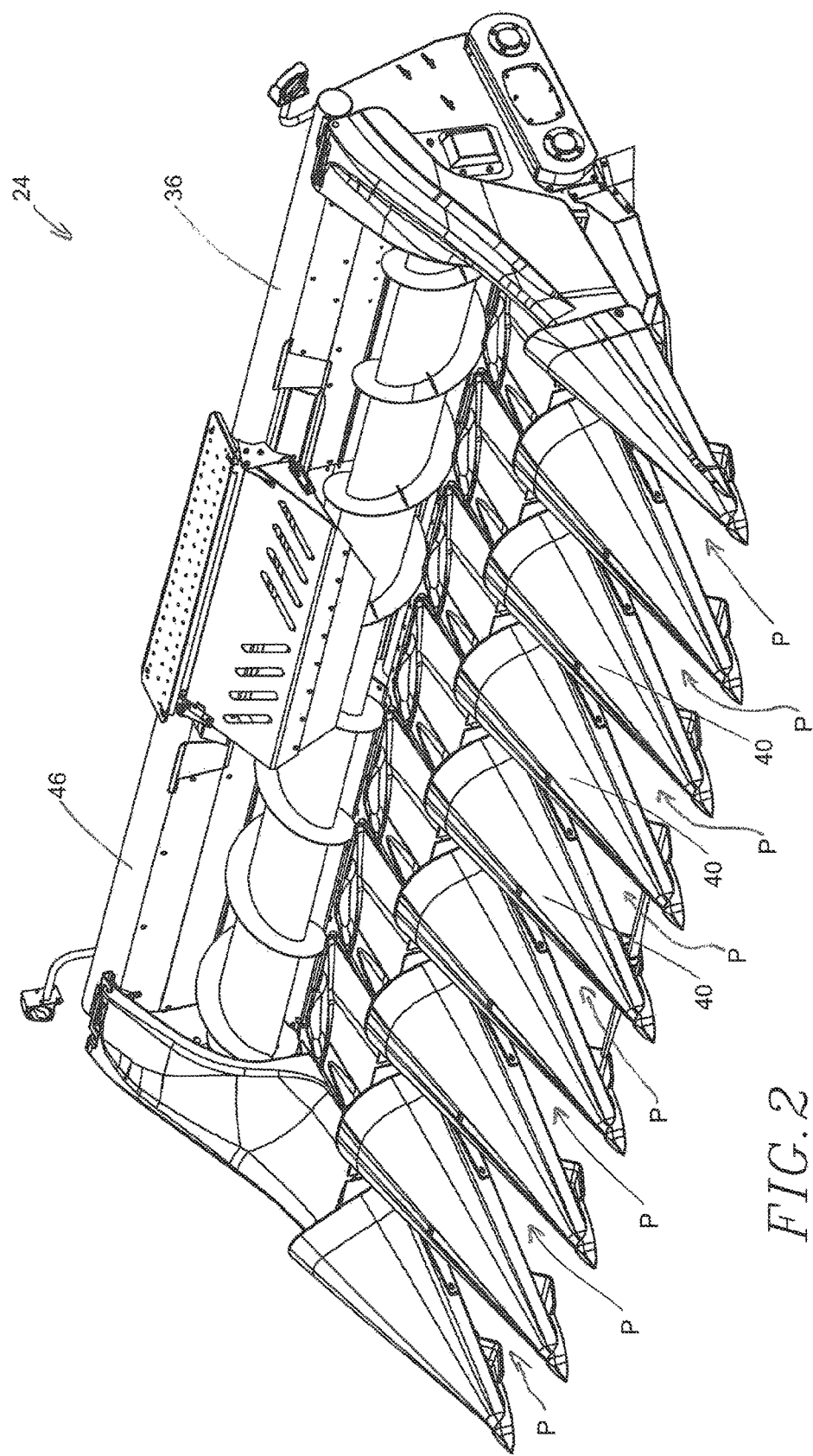
FIG. 2 is a front perspective of the row crop header shown in FIG. 1, showing among other things, a header frame, an auger, and a series of row unit hoods spaced laterally along the header frame.
Figure 3:
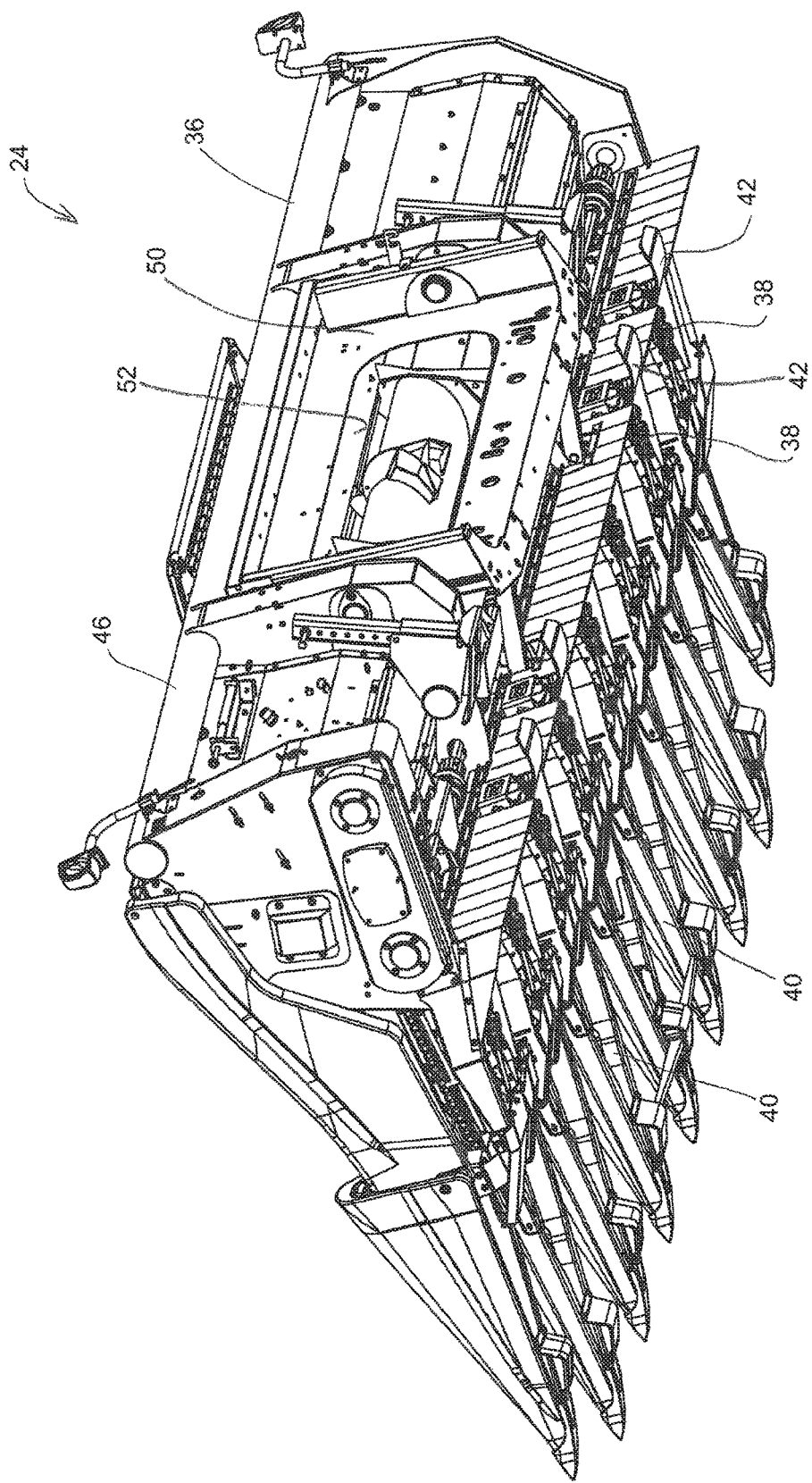
FIG. 3 is a lower perspective of the row crop header shown in FIGS. 1 and 2, showing the header frame, a series of row units supported below the hoods, and stalk stompers supported below the row units.
Figure 4:
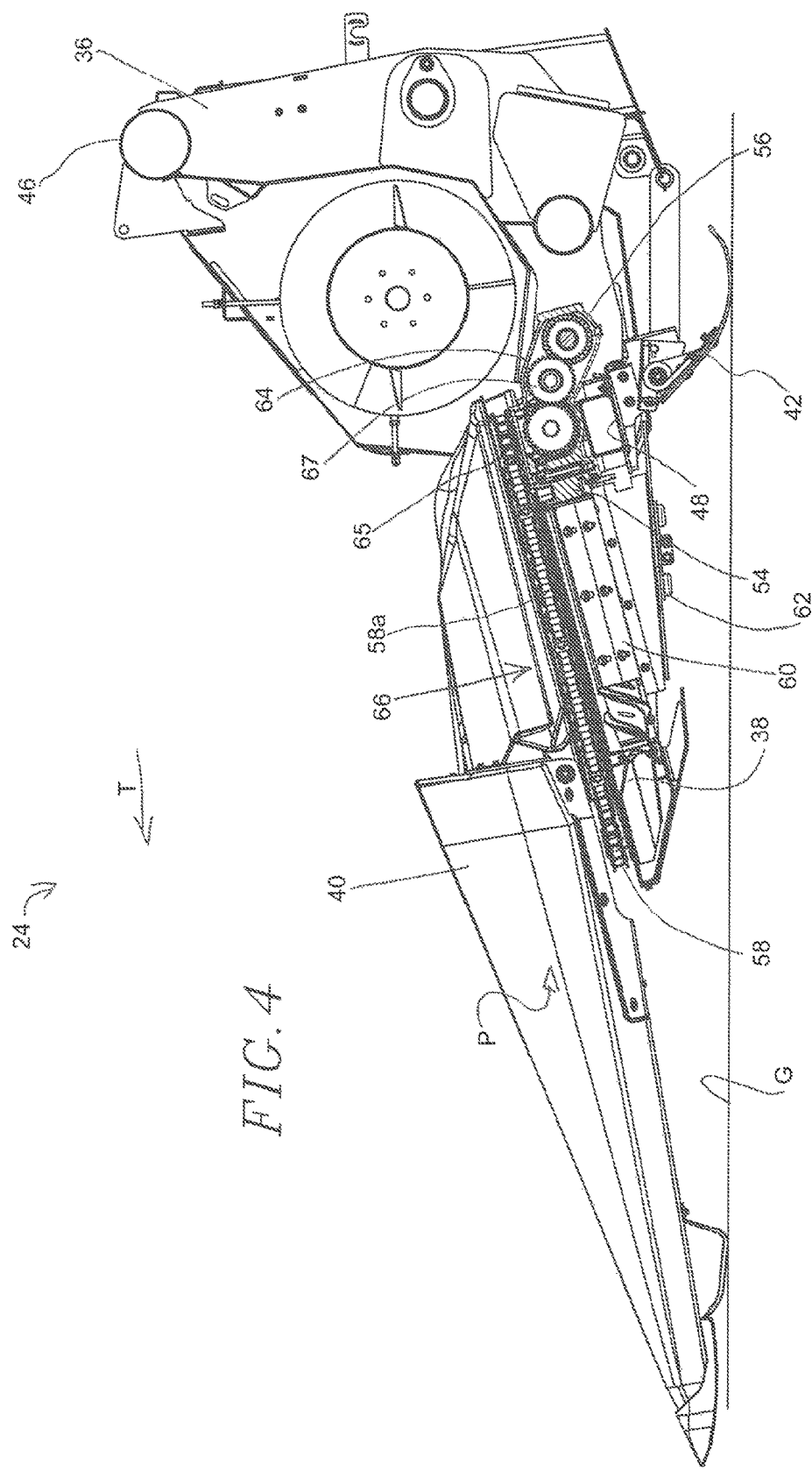
FIG. 4 is a cross section of the row crop header shown in FIGS. 1-3, showing a row unit housing, a row unit drive, a gathering chain assembly, a stalk roll, and a blade chopper of one of the row units.

Turning initially to FIG. 1, a crop harvester 20 is constructed in accordance with a preferred embodiment of the present invention. In the usual manner, the harvester 20 is operable to be advanced in a forward travel direction T to sever crop from a field (not shown). The harvester 20 presents a fore-and-aft extending longitudinal axis that extends in the travel direction T. As is customary, the illustrated harvester 20 produces clean grain from the severed crop material by separating the clean grain from material other than grain (MOG).

The illustrated crop harvester 20 is preferably configured to harvest a row crop, such as corn, and broadly includes a wheeled chassis 22 and a row crop header 24. Preferably, the wheeled chassis 22 comprises a self-propelled machine that collects the separated grain and generally discharges MOG onto the field. The wheeled chassis 22 preferably includes a harvester frame 26, wheels 28, an operator enclosure 30, an engine (not shown) that powers the harvester 20, a storage bin 32 operable to store clean grain separated from MOG, and a feederhouse 34.

Turning to FIGS. 1-4, the row crop header 24 comprises a corn header that is operable to be advanced along a series of side-by-side corn rows (not shown) to sever and gather corn plants from the field. However, it is within the ambit of the present invention where the header 24 is alternatively configured and used to harvest other row crops, such as sorghum, soybeans, sunflowers, etc. The header 24 preferably includes a header frame 36, a plurality of row units 38 spaced laterally along the length of the header frame 36, hoods 40 spaced laterally and positioned above the row units 38, and stalk stompers 42. Each stalk stomper 42 preferably includes a removable brace 44, as will be discussed further.

The header frame 36 supports the row units 38, hoods 40, and the stalk stompers 42 above the ground G. The header frame 36 preferably includes, among other things, an upper beam 46 and a lower toolbar 48 that both extend laterally relative to the travel direction T and along the length of the header frame 36. In the usual manner, the header frame 36 further includes a rear mounting interface 50 that is removably attached to a forward end of the feederhouse 34. The rear mounting interface 50 presents a header discharge opening 52 through which severed plant material is discharged from the header to the feederhouse 34 (see FIG. 3). As will be discussed, the toolbar 48 is attached to and supports the row units 38, hoods 40, and the stalk stompers 42.

The row units 38 are operable to be supported by the header frame 36 and advanced along the corn rows so that each row unit 38 collects a series of plants that define a respective one of the corn rows. In particular, each row unit 38 defines a fore-and-aft extending row path P (see FIG. 2) along which the row unit 38 is operable to collect the respective corn row. Again, the principles of the present invention are applicable where the row units 38 (and other components of the header 24) are configured for harvesting row crops other than corn. Each row unit 38 preferably includes a row unit housing 54, a row unit drive 56, a pair of gathering chain assemblies 58, a pair of stalk rolls 60, and a blade chopper 62 (see FIG. 4). The row unit housing 54 includes a drive housing 64 and a deck plate 65 (see FIG. 4).

The deck plate 65 includes a pair of side-by-side deck plate sections located vertically between the gathering chain assemblies 58 and the stalk rolls 60. The deck plate sections are located adjacent to one another to cooperatively define an elongated deck plate opening 66 that receives the plant stalks and at least partly forms the row path P.

In the usual manner, the pair of gathering chain assemblies 58 are positioned along opposite sides of the deck plate opening 66 to cooperatively urge plants rearwardly through the deck plate opening 66. More particularly, each gathering chain assembly 58 includes an endless chain that presents an inboard run 58a and an outboard run (not shown). For each pair of gathering chain assemblies 58, the inboard runs 58a are opposed to one another and cooperatively engage the plants. Furthermore, as the pair of gathering chain assemblies 58 are operated, the corresponding inboard runs 58a both move rearwardly to cooperatively move the plants rearwardly relative to the deck plate 65.

The pair of stalk rolls 60 are positioned along opposite sides of the deck plate opening 66 and rotate in opposite directions to cooperatively pull the plant stalks downwardly. In particular, the stalk rolls 60 provide multiple pairs of blades that rotate into and out of engagement with one another. As the stalk rolls 60 are rotated, each pair of blades moves generally in a downward direction as the pair of blades rotate into and out of engagement. Thus, while the stalk rolls 60 are rotated, each pair of blades operates to pinch the plant stalks and pull the plant stalks downwardly.

The drive 56 is operable to power the gathering chain assemblies 58 and the stalk rolls 60. The drive 56 preferably includes a gear train 67 located within the drive housing 64 and a motor (not shown) that powers the gear train 67. The gear train 67 is operably housed within the drive housing 64.

The drive housing 64 comprises a rigid sealed enclosure and preferably includes lower mounting bosses 68 with internal threads (not shown). The drive housing 64 also presents lateral channels 70 that extend between pairs of the bosses 68 (see FIG. 9). The channels 70 are sized and configured to securely receive the toolbar 48.

The row unit housing 54 also preferably includes tubular spacers 72, a pair of elongated brackets 74, and threaded bolts 75 (see FIG. 7). The spacers 72 and bolts 75 cooperatively provide forward and aft fasteners 76a,b to secure the illustrated drive housing 64 to the toolbar 48. The brackets 74 each comprise a unitary rigid element that is elongated and presents forward and rearward bracket ends 74a,b (see FIG. 7), with fastener holes (not shown) being adjacent the bracket ends 74a,b. Each bracket 74 presents a generally planar upper support surface 77 (see FIG. 5) that extends along the length of the bracket 74. While the illustrated brackets 74 are preferred to secure the drive housing 64 to the toolbar 48, the brackets 74 could be alternatively constructed without departing from the scope of the present invention. Also, each drive housing 64 could be secured to the toolbar 48 with an alternative number of brackets 74 (e.g., where the drive housing 64 is mounted with a single bracket 74).

The spacers 72 each have a cylindrical outer surface and present a bore (not shown) that extends through the spacer 72. The bore is sized to slidably receive a corresponding one of the bolts 75. The bolts 75 are removably inserted through the spacers 72 so as to be threaded into the bosses 68. While the illustrated fasteners 76a,b are preferred, the principles of the present invention are applicable where the row unit housing 54 includes alternative fasteners for being secured to the toolbar 48.

The drive housing 64 is removably secured to the toolbar 48 by positioning the drive housing so that the channel 70 receives the toolbar 48, with bosses 68 located on opposite sides of the toolbar 48. Each bracket 74 is positioned below the toolbar 48 so that the support surface 77 faces upwardly and receives a pair of spacers 72. The bolts 75 are inserted through the bracket 74 and the corresponding spacers 72 by aligning the bores of the spacers 72 with the fastener holes of the bracket 74.

With the bracket 74, spacers 72, and bolts 75 being located below the toolbar 48 and the support surface 77 facing upwardly, the bolts 75 can be threaded into engagement with the respective bosses 68. The bolts 75 are threaded into engagement with the bosses 68 so that the support surface 77 is brought into engagement with the toolbar 48, with the drive housing 64 and the bracket 74 being clamped against opposite sides of the toolbar 48. In this manner, the row unit housing 54 is securely mounted to the toolbar 48. However, it is within the ambit of the present invention where the row unit housing 54 is alternatively mounted on the toolbar 48. For instance, the header 24 could include mounting components other than the spacers 72, brackets 74, and fasteners 76a,b to secure the drive housing 64 to the toolbar 48.

Turning to FIGS. 5-9, each stomper 42 is laterally aligned with a respective one of the row paths P to engage and knock down severed plant stalks (not shown) along the corresponding corn row. As will be described in greater detail, the stomper 42 is preferably configured to be attached to the mounting components of the row unit housing 54 and relative to the toolbar 48. Most preferably, the stomper 42 can be attached and detached relative to the toolbar 48 without attaching or removing the fasteners 76a,b from the row unit housing 54. The illustrated stomper 42 preferably includes a mounting base 78, a skid support bracket 80, a skid adjustment bracket 82, and a skid 84.

Preferably, the mounting base 78 comprises a rigid structure and includes a mounting plate 86 and a reinforcing rim 88 (see FIGS. 7 and 9). The illustrated mounting plate 86 is unitary and preferably includes a body 90, a pair of forward tabs 92 that project laterally from the body 90, and a rearward upturned lip 94. The depicted tabs 92 each present curved notches 96 that face rearwardly. As will be described further, the notches 96 are operable to receive and engage corresponding ones of the fasteners. However, it is within the ambit of the present invention where the tabs 92 are alternatively configured. For instance, the tabs 92 could be constructed to removably grasp the corresponding fastener 76a,b (e.g., where the notches 96 are shaped so that the tabs 92 are snapped into and out of engagement with the fasteners 76a,b). For some aspects of the present invention, the tabs 92 could each present a hole to receive one of the fasteners 76a,b such that attachment and removal of the mounting base 78 requires attachment and removal of the fasteners 76a,b from the drive housing 64.

The lip 94 is unitary and preferably presents a cam surface 98 that faces forwardly and is aligned relative to the body 90 at an oblique angle. As will be discussed further, the cam surface 98 of the lip 94 slidably engages the brace 44. It will be appreciated that the lip 94 could be alternatively configured without departing from the scope of the present invention. For instance, the lip 94 could include multiple sections spaced laterally from one another.

The body 90 of the mounting plate 86 interconnects the tabs 92 and the lip 94 of the mounting plate 86. The body 90 preferably includes a flat plate that presents longitudinal side edges 100 and a central opening 102 (see FIG. 8).

The reinforcing rim 88 is unitary and includes a rear wall 104, side walls 106, and forward end walls 108 (see FIGS. 7 and 9). The rim 88 is preferably positioned so that the rear wall 104 extends laterally below the lip 94, the side walls 106 extend longitudinally adjacent to corresponding side edges 100, and the end walls 108 extend below corresponding tabs 92. The illustrated mounting plate 86 and rim 88 are preferably welded to one another. The mounting plate 86 and reinforcing rim 88 each preferably include an alloy carbon steel material, although these components could include an alternative material.

The mounting plate 86 and reinforcing rim 88 cooperatively present forward and aft mounting ends 78a,78b of the mounting base 78 (see FIG. 8). The forward mounting end 78a preferably includes the forward tabs 92. The aft mounting end 78b preferably includes the rearward upturned lip 94. However, it will be appreciated that the mounting ends 78a,b could be alternatively configured without departing from the scope of the present invention.

The skid support bracket 80 preferably comprises a unitary, generally U-shaped structure and includes a rear wall 110 and side walls 112. Each side wall 112 presents three (3) slotted openings 114 positioned alongside one another (see FIG. 7). The rear wall 110 presents a central opening 116. The side walls 112 of the skid support bracket 80 are secured to the side walls 106 of the rim 88 with fasteners 118 (see FIGS. 7 and 9).

The illustrated skid adjustment bracket 82 comprises a unitary structure and preferably includes a top wall 120 and side walls 122 (see FIGS. 7-9). Each side wall 122 presents a slotted opening 124.

Each side wall 122 of the skid adjustment bracket 82 is pivotally attached to a corresponding side wall 106 of the rim 88 by fasteners 118 to form pivot joints 126 (see FIG. 7). Thus, the pivot joints 126 permit the skid adjustment bracket 82 to swing relative to the mounting base 78 and the skid support bracket 80 about a transverse bracket pivot axis Ab (see FIG. 9).

The skid adjustment bracket 82 is adjustably connected to the skid support bracket 80 with a removable pin 128. In particular, the pin 128 can be selectively inserted through the slotted openings 124 of the skid adjustment bracket 82 and through a corresponding pair of the slotted openings 114 of the skid support bracket 80. Thus, the pin 128 is operable to removably secure the skid adjustment bracket 82 in one of three (3) discrete positions relative to the skid support bracket 80.

Turning to FIGS. 7-9, the skid 84 is operable to engage and knock down severed stalks of corn (not shown) as the header 24 is advanced forwardly over the ground G. As the skid 84 is advanced, the skid 84 may be spaced above the ground G or may be in sliding engagement with the ground G. In any event, the skid 84 is preferably configured to engage the ground G as the header 24 is advanced in the forward travel direction T. The skid 84 preferably includes a skid plate 130 and a plate mounting bracket 132.

The illustrated plate mounting bracket 132 is unitary and includes a base wall 134, a forward lip 136, and side walls 138. Preferably, the side walls 138 are pivotally attached to corresponding side walls 122 of the skid adjustment bracket 82 with a fastener 140 to form a skid pivot joint 142 (see FIGS. 7 and 9). Thus, the depicted plate mounting bracket 132 is used to pivotally support the skid 84 so that the skid 84 can pivot relative to the skid adjustment bracket 82 about a transverse skid pivot axis As (see FIG. 9).

The skid plate 130 is also unitary and includes an attachment section 144 and a lower depending section 145 that depends below the attachment section 144. The depending section 145 preferably comprises a unitary plate element and includes a lowermost ground-engaging margin 146. The skid plate 130 is removably secured to the plate mounting bracket 132 with fasteners 147 so that the skid plate 130 and plate mounting bracket 132 pivot with one another relative to the skid adjustment bracket 82. In the illustrated embodiment, the plate mounting bracket 132 is attached to the attachment section 144 of the skid plate 130, with the attachment section 144 being secured so as to be more rigid than the lower depending section 145.

The skid plate 130 also preferably includes transverse slots 148 that cooperatively form a relatively weak deformation region 149 (see FIGS. 7-9). The illustrated slots 148 project laterally inboard from and extend at a generally oblique angle relative to corresponding side edges 130a of the skid plate 130. When the skid plate 130 is mounted to the plate mounting bracket 132, the lowermost end of the bracket 132 is preferably longitudinally aligned with the deformation region 149. The configuration of the deformation region 149 permits the skid plate 130 to bend along the deformation region 149 in response to relative movement between the attachment section 144 and the ground-engaging margin 146 (e.g., due to an excessive force applied to the skid plate 130).

Again, the skid 84 is pivotally mounted at the skid pivot joint 142 so that the skid 84 can pivot relative to the skid adjustment bracket 82. However, it will be appreciated that the skid 84 could be alternatively mounted. For instance, the skid 84 could be slidably mounted relative to the mounting base 78 to slide up and down along an upright direction.

The forward lip 136 extends upwardly to restrict pivotal movement of the skid 84. More particularly, the skid 84 is pivotal into and out of a lowermost skid position where the forward lip 136 engages the top wall 120 of the skid adjustment bracket 82. Consequently, the forward lip 136 and the skid adjustment bracket 82 cooperatively restrict the lowermost margin 146 of the skid 84 from pivoting downwardly beyond the lowermost skid position.

The stalk stomper 42 also preferably includes a torsion spring 150 mounted on the skid pivot joint 142 (see FIG. 9). The torsion spring 150 includes spring ends 152, with one of the spring ends 152 engaging the top wall 120 and the other spring end 152 secured to the plate mounting bracket 132 with a keeper strap 154 and the fasteners 147. The torsion spring 150 is preferably configured to urge the skid 84 into the lowermost skid position. However, it is within the ambit of the present invention where the stomper 42 includes an alternative device to urge the skid 84 into the lowermost skid position. For instance, the stomper 42 could include an alternative mechanical spring or a hydraulic cylinder. It will also be appreciated that such mechanisms could also be used to selectively urge the skid 84 in an upward direction. Furthermore, the stomper 42 could include a motion damping mechanism to control movement of the skid 84 relative to the mounting base 78.

The skid support bracket 80, skid adjustment bracket 82, and the skid 84 each preferably include an alloy carbon steel material, although one or more of these components could include an alternative material.

Referring again to FIGS. 5-9, each brace 44 is unitary and includes a rear wall 156 and a lower flange 158. The rear wall 156 includes endmost tabs 160 that project laterally beyond the lower flange 158. The tabs 160 preferably curve forwardly and cooperate with the flange 158 to present open slots 162 (see FIG. 8).

The brace 44 is preferably positioned so that the tabs 160 engage corresponding spacers 72, with the spacers 72 being received by the open slots 162. At the same time, the tabs 160 engage the brackets 74 so that the brackets 74 support the brace 44.

With the brace 44 supported by the brackets 74, the stomper 42 can be secured to the toolbar 48. The stomper 42 is initially positioned so that the tabs 92 of the mounting base 78 are positioned on the forward margins of corresponding brackets 74, with the notches 96 receiving respective spacers 72. As the tabs 92 are positioned in this manner, the upturned lip 94 of the mounting base 78 is preferably spaced below the brace 44. The connection between the tabs 92 of the mounting base 78, the spacers 72, and the front ends of the brackets 74 permits the stomper 42 to be swung relative to the toolbar 48 through a limited range of pivotal movement about a lateral axis. In particular, this connection permits pivoting of the stomper 42 into and out of a mounted position (see FIGS. 7 and 9).

With the tabs 92 of the mounting base 78 supported on the brackets 74, the stomper 42 can be swung into and selectively secured in the mounted position. In the illustrated embodiment, the header 24 includes fasteners 164 that extend through the mounting plate 86 and the flange 158 of the brace 44 to secure these components to one another.

The mounting base 78, skid support bracket 80, skid adjustment bracket 82, removable fastening pin 128, and the removable brace 44 cooperatively provide an adjustable stomper frame 166 operable to selectively attach the stalk stomper 42 relative to the toolbar 48. As discussed above, the skid adjustment bracket 82 of the stomper frame 166 is selectively secured by the pin 128 in one of a plurality of positions relative to the skid support bracket 80 to control the orientation of the skid 84.

The stomper frame 166 is also preferably configured to permit selective attachment and detachment of the stalk stomper 42 relative to the toolbar 48. Most preferably, the stomper frame 166 is configured so that the stomper 42 can be attached and detached relative to the toolbar 48 without attaching or removing the fasteners 76a,b from the row unit housing 54.

In operation, the stomper 42 is removably secured relative to the toolbar 48. The stomper 42 is initially positioned so that the tabs 92 of the mounting base 78 are located on the forward margins of corresponding brackets 74, with the notches 96 receiving respective spacers 72. At the same time, the upturned lip 94 of the mounting base 78 is preferably spaced below the brace 44. The stomper 42 can then be swung relative to the toolbar 48 into a mounted position so that the lip 94 engages the braced 44 (see FIGS. 7 and 9). While in this position, fasteners 164 can be used to secure the mounting plate 86 and the flange 158 of the brace 44 to one another.

With the stomper 42 secured, the header 24 can be advanced over the ground G to harvest multiple rows of corn. As the header 24 is advanced, the stomper 42 moves along the ground G to engage and knock down the severed stalks of one of the corn rows.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A row crop harvesting header operable to be advanced along a forward travel direction to harvest a series of plants in a crop row, said row crop harvesting header comprising:
   a row crop toolbar that extends laterally relative to the forward travel direction;
   a crop-gathering row unit assembly supported by the toolbar to define a fore-and-aft extending row path, with the row unit assembly being operable to collect the crop row along the row path and sever crop stalks as the header moves forwardly,
   said row unit assembly including a row unit bracket supported by and located adjacent to the row crop toolbar along at least one side of the row path to support the row unit assembly,
   said row unit assembly being attached to the row crop toolbar by a forward fastener and an aft fastener located, respectively, forward and aft of the toolbar; and
   a plant stalk stomper attached to the toolbar using at least one of the forward and aft fasteners,
   said plant stalk stomper being laterally aligned with the row path to engage and knock down the severed stalks of the crop row.

2. The row crop harvesting header as claimed in claim 1,
   said plant stalk stomper including an elongated stomper skid plate operable to engage the ground as the stomper is advanced in the forward travel direction,
   said plant stalk stomper including a frame supporting the skid plate relative to the toolbar, with the skid plate being supported by the frame.

3. The row crop harvesting header as claimed in claim 2,
   said frame including a mounting base secured to the toolbar by both fasteners.

4. The row crop harvesting header as claimed in claim 2,
   said frame including a mounting base secured to the toolbar by the at least one fastener.

5. The row crop harvesting header as claimed in claim 4,
   said mounting base presenting opposite forward and aft mounting ends,
   one of said mounting ends of the mounting base being attached directly to a respective one of the forward and aft fasteners, with the mounting base presenting a cam surface along the other one of the mounting ends,
   said frame including a brace element supported by the other one of the fasteners adjacent the cam surface, with the brace element engaging the cam surface to hold the mounting base under tension between the forward and aft fasteners.

6. The row crop harvesting header as claimed in claim 4,
   said mounting base being secured below the toolbar by the at least one fastener.

7. The row crop harvesting header as claimed in claim 4,
   said frame further including an adjustment bracket that supports the skid plate,
   said adjustment bracket being pivotally attached to the mounting base at a bracket pivot joint that defines a transverse bracket pivot axis to permit the skid plate to be selectively adjustably positioned relative to the mounting base among a plurality of positions.

8. The row crop harvesting header as claimed in claim 7,
   said frame including a fastener removably attached to the adjustment bracket, with the fastener being operable to selectively secure the adjustment bracket relative to the mounting base in one of the positions.

9. The row crop harvesting header as claimed in claim 7,
   said skid plate being pivotally mounted relative to the adjustment bracket to pivot about a transverse skid pivot axis.

10. The row crop harvesting header as claimed in claim 9,
    said skid plate presenting an attachment section along which the skid plate is mounted relative to the frame,
    at least part of said skid plate including a unitary plate element that depends below the attachment section to present a lowermost ground-engaging margin.

11. The row crop harvesting header as claimed in claim 10,
    said plant stalk stomper including a plate mounting bracket pivotally attached to the adjustment bracket at a skid pivot joint that defines the transverse skid pivot axis,
    said plate mounting bracket being attached to the skid plate along the attachment section, with the plate mounting bracket supporting the skid plate so that the attachment section of the skid plate is more rigid than the unitary plate element.

12. The row crop harvesting header as claimed in claim 11,
    said unitary plate element including a relatively weak deformation region located between the attachment section and the ground-engaging margin, with the unitary plate element operable to bend along the deformation region in response to relative movement between the attachment section and the ground-engaging margin,
    said plate mounting bracket extending to a lowermost bracket end,
    said deformation region and said lowermost bracket end being longitudinally aligned with one another.

13. The row crop harvesting header as claimed in claim 12,
   said deformation region being spaced rearwardly of the transverse skid pivot axis.

14. The row crop harvesting header as claimed in claim 12,
   said unitary plate element including a transverse slot that at least partly forms the deformation region.

15. The row crop harvesting header as claimed in claim 14,
   said unitary plate element presenting opposite side edges that extend longitudinally between the attachment section and the ground-engaging margin,
   said unitary plate element including another transverse slot, with each slot intersecting and projecting laterally inboard from a respective one of the side edges.

16. The row crop harvesting header as claimed in claim 10,
   said plant stalk stomper including a spring that urges the ground-engaging margin of the skid plate downwardly into a lowermost position.

17. The row crop harvesting header as claimed in claim 16,
   said spring comprising a torsion spring mounted on the skid pivot joint,
   said torsion spring engaging the plate mounting bracket to urge the ground-engaging margin downwardly.

18. The row crop harvesting header as claimed in claim 17,
   said unitary plate element projecting rearwardly from the attachment section to the ground-engaging margin.

19. The row crop harvesting header as claimed in claim 2,
   said row unit assembly including a pair of gathering chain assemblies supported by the row unit housing and extending forwardly of the toolbar,
   said gathering chain assemblies positioned laterally on respective sides of the row path, with the gathering chain assemblies being operable to receive the crop row as the header moves forwardly.

20. The row crop harvesting header as claimed in claim 19,
   said row unit assembly including a plant severing mechanism located below the gathering chain assemblies and operable to sever stalks of plants moving along the row path.

* * * * *